United States Patent [19]

Warshaw et al.

[11] 3,956,189

[45] *May 11, 1976

[54] CATALYST FOR TREATING COMBUSTION EXHAUST GAS

[75] Inventors: Abe Warshaw, Matawan; John S. Negra, South Plainfield; John F. Tourtellotte, Westfield, all of N.J.

[73] Assignee: Chemical Construction Corporation, New York, N.Y.

[ * ] Notice: The portion of the term of this patent subsequent to June 5, 1990, has been disclaimed.

[22] Filed: May 18, 1973

[21] Appl. No.: 361,778

Related U.S. Application Data

[62] Division of Ser. No. 226,296, Feb. 14, 1972.

[52] U.S. Cl. ............................ 252/466 J; 423/213.5
[51] Int. Cl.² ................... B01J 21/04; B01J 23/76
[58] Field of Search ............... 252/466 J; 423/213.2, 423/213.5, 239

[56] References Cited
UNITED STATES PATENTS

| | | | |
|---|---|---|---|
| 3,228,746 | 1/1966 | Howk et al. | 423/213.2 |
| 3,310,366 | 3/1967 | Koepernik | 423/213.2 |
| 3,433,581 | 3/1969 | Stephens et al. | 423/213.2 |
| 3,699,683 | 10/1972 | Tourtellotte et al. | 423/213.2 |
| 3,737,396 | 6/1973 | Negra et al. | 252/466 J |

FOREIGN PATENTS OR APPLICATIONS

| | | | |
|---|---|---|---|
| 2,057,633 | 5/1971 | France | 252/471 |

*Primary Examiner*—W. J. Shine
*Attorney, Agent, or Firm*—Alvin H. Fritschler

[57] ABSTRACT

The exhaust gas discharged from an engine such as an internal combustion engine or the like is treated to convert harmful or noxious pollutant components such as nitrogen oxides, carbon monoxide and unburned hydrocarbons to innocuous compounds, by contacting the exhaust gas with two stages in series of a catalyst composition containing 8% to 20% by weight of copper as equivalent copper oxide, 1% to 5% by weight of cobalt as equivalent cobalt oxide, and 0.5% to 3% by weight of manganese as equivalent manganese dioxide, deposited on particles of transitional alumina having a surface area in the range of 200 to 400 square meters per gram. The copper and cobalt are at least partially present in the form of reduced oxides, and the catalyst may also contain 1% to 5% nickel as equivalent nickel oxide. Air is injected into the partially reacted exhaust gas between stages, so that a reduction of nitrogen oxides takes place in the first catalytic stage or bed, and oxidation of carbon monoxide and hydrocarbons to innocuous compounds such as carbon dioxide and water vapor takes place in the second catalytic stage or bed.

3 Claims, No Drawings

CATALYST FOR TREATING COMBUSTION EXHAUST GAS

The present case is a division of U.S. Pat. application Ser. No. 226,296 filed Feb. 14, 1972.

BACKGROUND OF THE INVENTION

1. Field of the Invention

The invention relates to the elimination of deleterious compounds such as nitrogen oxides, carbon monoxide and residual hydrocarbons, which are present in the exhaust gas from engines provided for vehicles such as automobiles, trucks, buses, motorcycles and tractors. The invention prevents the discharge of these noxious components into the atmosphere, and thereby prevents air pollution. Application of the invention to engines in general will be understood to encompass other types of combustion devices and engines such as gas turbines, diesel engines and the like.

2. Description of the Prior Art

In recent years it has been recognized that the exhaust gas discharged from internal combustion engines is a serious source of air pollution, especially in metropolitan areas. In some cases, a so-called smog is generated due to atmospheric inversions and accumulation of such exhaust gases in the atmosphere. Recent attempts to prevent such air pollution have concentrated on the destruction or elimination of noxious components by catalysis, especially by catalytic reduction of nitrogen oxides followed by admixture of secondary air into the exhaust gas and catalytic oxidation of residual hydrocarbons, carbon monoxide, etc., in various types of apparatus especially designed for this purpose. Improvements in active catalytic agents for this function are described in U.S. Pat. Nos. 3,053,773; 3,316,057; 3,429,656; 3,476,508 and 3,310,366, and U.S. patent application Ser. No. 45,576 filed June 11, 1970 now U.S. Pat. No. 3,701,822. Copper-bearing catalysts are generally U.S. Pat. Nos. 3,398,101; 3,447,893; 3,493,325; 3,133,029 and 2,025,140 and U.S. patent application Ser. No. 55,998 filed July 17, 1970, allowed Dec. 30, 1971, and abondoned in favor of U.S. Pat. application Ser. No. 237,516 filed Mar. 23, 1972 and now allowed and issued as U.S. Pat. No. 3,840,642. Two-stage apparatus for carrying out the process with interstage air injection is described in U.S. patent applications Ser. Nos. 33,359 filed Apr. 30, 1970 now U.S. Pat. No. 3,656,915 and 143,401 filed May 14, 1971 now U.S. Pat. No. 3,733,181.

SUMMARY OF THE INVENTION

In the present invention, it has been determined that a catalytic agent containing copper in the range of 8% to 20% by weight of equivalent copper oxide, cobalt in the range of 1% to 5% by weight of equivalent cobalt oxide, and manganese in the range of 0.55 to 3% by weight of equivalent manganese dioxide, with these metals being deposited on discrete preferably spherical particles of transitional alumina having a surface area in the range of 200 to 400 square meters per gram, provides a highly effective catalyst for treating exhaust gases from engines such as internal combustion engines or the like, in order to reduce nitrogen oxides to nitrogen, and also oxidize carbon monoxide and residual or thermally degraded vaporous hydrocarbons to carbon dioxide and water vapor. The catalyst may also contain 1% to 5% nickel as equivalent nickel oxide. The copper will generally be present as CuO, the cobalt will generally be present as $Co_2O_3$, and the manganese will generally be present as $MnO_2$, however these metals may be at least partially present as reduced oxides or in the metallic state. Similar considerations apply to nickel, when present. In the description and claims infra, catalyst compositions will refer to these metallic components in terms of equivalent oxide content, however the copper and cobalt may be partially present in actuality as other compounds or as reduced elemental metals or in the metallic state. However, equivalent oxide composition in accordance with the formulas supra is reported on analysis, as is customary in the art.

The exhaust gas is passed through two catalyst beds or masses in series containing copper oxide, cobalt oxide and manganese dioxide deposited on particles of transitional alumina, such is generally prepared by heating a hydrated alumina to a temperature somewhat above 100°C and up to 150°C so as to cause partial dehydration without total conversion to alpha alumina. The transitional alumina is characterized by a porous structure and high surface area of typically 200 to 400 square meters per gram, compared to alpha alumina which is generally more dense and has a low surface area.

Air is injected into the partially reacted gas between the beds or stages, so that the initial bed functions as a reducing medium to eliminate nitrogen oxides and the final bed acts as an oxidizing agent to oxidize carbon monoxide and residual hydrocarbon vapors. It has been determined that highly beneficial results are thereby attained, in terms of removal of nitrogen oxides from the exhaust gas by reduction, and removal of carbon monoxide and hydrocarbon vapors by oxidation, due to the synergistic action of the copper, cobalt and manganese together with the high surface area transitional alumina. Thus, the invention is practiced with two catalyst beds in series, in which series flow of exhaust gas takes place through the two beds and air which may be preheated is injected into the partially reacted exhaust gas between beds. A typical apparatus for carrying out the process is described in U.S. patent application Ser. No. 33,359 filed Apr. 30, 1970 now U.S. Pat. No. 3,656,915. A temperature level generally in the range of 200°C to 800°C will usually be provided in the catalyst beds during reaction, however the invention may be practiced at lower temperatures, such as when starting a cold automobile engine, or at temperatures above 800°C.

It is an object of the present invention to provide an improved process and catalyst for treating exhaust gases from engines to remove noxious components.

Another object is to prevent air pollution due to the discharge of exhaust gas from engines such as internal combustion engine.

A further object is to provide an improved process and catalyst for catalytically reducing nitrogen oxides and oxidizing carbon monoxide and hydrocarbon vapor in the exhaust gas from an internal combustion engine.

An additional object is to provide a synergistic combination of specific proportions of copper, cobalt and manganese together with optional nickel, deposited on transitional alumina, in a catalyst composition for treating the exhaust gas from internal combustion engines.

These and other objects and advantages of the present invention will become evident from the description which follows.

DESCRIPTION OF THE PREFERRED EMBODIMENTS AND EXAMPLES

The catalysts are prepared by impregnation of the transitional alumina carrier with solutions of salts of the catalytic metals. The salts are decomposed by heating the impregnated carrier to an optimum temperature for a definite period of time. The metallic oxides resulting from the decomposition of the various salts may then be reduced to the base metals or to lower oxide states. The reduction may take place in situ or a pre-reduction step employing hydrogen may be provided.

The preferred carrier is formed transitional alumina in cylindrical or spherical shape. The particles of transitional alumina have a surface area in the range of 200 to 400 square meters per gram, and high structural strength. A preferred carrier is 1/8 in. transitional alumina spheres having a surface area of 250 to 350 square meters per gram, which has a high absorptivity capacity for the active metals.

The catalytic metal salts may be those classed as metal-organic types such as the acetates, formates, oxalates, etc., or the heat decomposible inorganic compounds such as the carbonates or nitrates. The metals employed in a preferred embodiment are copper, cobalt, manganese and nickel. The ratio of these metals as well as the quantity in the final catalyst is of the utmost importance. If the proper ratios are achieved these metals have a synergistic effect on each other, while the right quantity insures maximum activity and stability.

The most preferred metal ratios, by weight, are about one part of manganese to about three parts of cobalt and ten parts of copper, together with three parts of nickel, all deposited on transitional alumina. The percentages of these metals may range from about 8% to 20% by weight of equivalent copper oxide, 1% to 5% by weight of equivalent cobalt oxide, and 0.5% to 3% by weight of equivalent manganese dioxide. In addition, nickel in the range of 1% to 5% by weight of equivalent nickel oxide may also be present. A highly preferred catalyst composition contains 15% to 18% copper, 2.5% to 4% cobalt, and 1% to 2% manganese, all expressed as equivalent oxides, and deposited on the transitional alumina carrier of the present invention.

Examples of methods of catalyst preparation and testing will now be described.

EXAMPLE I

The preferred method of catalyst preparation is as follows:

| | |
|---|---|
| Water (heated to 65°C) | 6000 milliliters |
| Cu (NO$_3$)$_2$·3H$_2$O | 7500 grams |
| Co (NO$_3$)$_2$·6H$_2$O | 2225 grams |
| Mn (NO$_3$)$_2$(50% solution) | 950 grams |
| NH$_4$NO$_3$ | 600 grams |
| HNO$_3$ (70–72%) | 50 milliliters |
| NH$_4$OH (28%–30% NH$_3$) | 100 milliliters |

The various salts and liquids are added in order and the temperature raised to 75°–80°C. To the clear solution are added 3600 grams of 1/8 in. transitional alumina spheres or cylinders as preferred. The mixture is digested at 75°–80°C for one hour, then cooled to approximately 25°C. The liquid is removed from the impregnated catalyst by decantation through a screen and the catalyst decomposed at 220°–230°C for 16 hours. After cooling the catalyst to room temperature, the impregnation procedure is repeated using the decanted liquor from the first treatment. The final dried and decomposed catalyst is reduced with hydrogen at 400°–450°C for 4 to 8 hours.

The catalyst prepared in this manner has unusually high activity in reducing engine exhaust gas pollutants such as nitrogen oxides, carbon monoxide and organic gaseous emissions to a very low level. These catalysts are also extremely resistant to fracture and abrasion, and maintain a high order of activity for a long period of time under varied and severe exposures.

EXAMPLE II

As mentioned supra in Example I, catalysts with improved and increased activity may be produced by multiple impregnation of a suitable support material with selective non-noble catalytic metal salts. It has been found over a lengthy period of investigation that catalysts have shown greater activity when treated in at least two stages instead of a single immersion in a catalytic metal salt mixture. That this increased activity is not solely due to increased metals content is proven by the fact that excessive immersions do not progressively increase activity but result, instead, in catalysts becoming less active than those catalysts having less metal deposited on them. Preferred metals are obtained by decomposition of the water or alcohol soluble salts of nickel, cobalt, copper and manganese.

Particulate transitional alumina in the form of 1/8 in. spheres and having a surface area of 250 to 350 square meters per gram is immersed in a concentrated solution of the following metal salts:

| | |
|---|---|
| Cu(NO$_3$)$_2$·3H$_2$O | 400 grams |
| Co (NO$_3$)$_2$·6H$_2$O | 150 grams |
| Ni (NO$_3$)$_2$·6H$_2$O | 150 grams |
| Mn (NO$_3$) (50% solution) | 50 grams |

These metal salts are dissolved in 1000 ml distilled water on a steam bath. The alumina particles are placed in a suitable container and the metal salts solution poured over the particles. The impregnation is extended for at least 1/2 hour and preferable 2 hours. The alumina particles are then removed from the solution and dried at 100°–110°C for 2–4 hours, and then for 8 hours at 300°–350°C. After cooling, the above procedure is repeated using the same solution as in the first treatment. This constitutes the entire treatment, and the catalyst is ready to be installed in an automobile exhaust device. Following are test results employing this catalyst in a two-stage device with interbed air injection.

Table I

| SINGLE IMMERSION CATALYST | | |
|---|---|---|
| | Test No. 1 | Test No. 2 |
| Inlet Gas Temperature °C | 250 | 350 |
| Exit Gas Temperature °C | 350 | 450 |
| Space Velocity V/V/HR | 19,000 | 19,000 |
| Inlet NO$_x$ (PPM) | 1605 | 1710 |
| Exit NO$_x$ (PPM) | 355 | 180 |
| Inlet Hydrocarbons (PPM) | 1420 | 2380 |
| Exit Hydrocarbons (PPM) | 516 | 310 |
| Inlet Carbon Monoxide (%) | 1.80 | 2.65 |
| Exit Carbon Monoxide (%) | 0.05 | 0.18 |
| % NO$_x$ Removal | 77.9 | 89.5 |
| % HC Removal | 63.7 | 87.0 |
| % CO Removal | 97.2 | 93.2 |

TABLE II

| DOUBLE IMMERSION CATALYST | | |
|---|---|---|
| | Test No. 1 | Test No. 2 |
| Inlet Gas Temperature °C | 180 | 210 |

Table I-continued

| DOUBLE IMMERSION CATALYST | | |
| --- | --- | --- |
| | Test No. 1 | Test No. 2 |
| Exit Gas Temperature °C | 320 | 345 |
| Space Velocity V/V/HR | 30,000 | 30,000 |
| Inlet NO$_x$ (PPM) | 995 | 1100 |
| Exit NO$_x$ (PPM) | 19 | 5 |
| Inlet Hydrocarbons (PPM) | 3035 | 3865 |
| Exit Hydrocarbons (PPM) | 870 | 770 |
| Inlet Carbon Monoxide (%) | 2.95 | 2.95 |
| Exit Carbon Monoxide (%) | 0.05 | 0.02 |
| % NO$_x$ Removal | 98.1 | 99.5 |
| % HC Removal | 71.3 | 80.1 |
| % CO Removal | 98.3 | 99.3 |

We claim:

1. A catalyst composition for the treatment of exhaust gas from an engine to remove noxious components which comprises between about 8% to 20% by weight of copper as equivalent copper oxide, between about 1% to 5% by weight of cobalt as equivalent cobalt oxide, and between about 0.5% to 3% by weight of manganese as equivalent manganese dioxide, said copper, cobalt and manganese being deposited on transitional alumina, said transitional alumina having a surface area in the range of 200 to 400 square meters per gram.

2. The catalyst composition of claim 1, in which about 1% to 5% by weight of nickel as equivalent nickel oxide is also deposited on said transitional alumina.

3. The catalyst composition of claim 1, in which between about 15% to 18% by weight of copper as equivalent copper oxide, between about 2.5% to 4% by weight of cobalt as equivalent cobalt oxide, and between about 1% to 2% by weight of manganese as equivalent manganese dioxide are deposited on said transitional alumina.

* * * * *